Nov. 16, 1943.   G. W. RATHJENS   2,334,217
SEPARATING MATERIAL, SEGREGATING MATERIAL AND CONTACTING MATERIAL
Filed Oct. 4, 1940   4 Sheets-Sheet 1
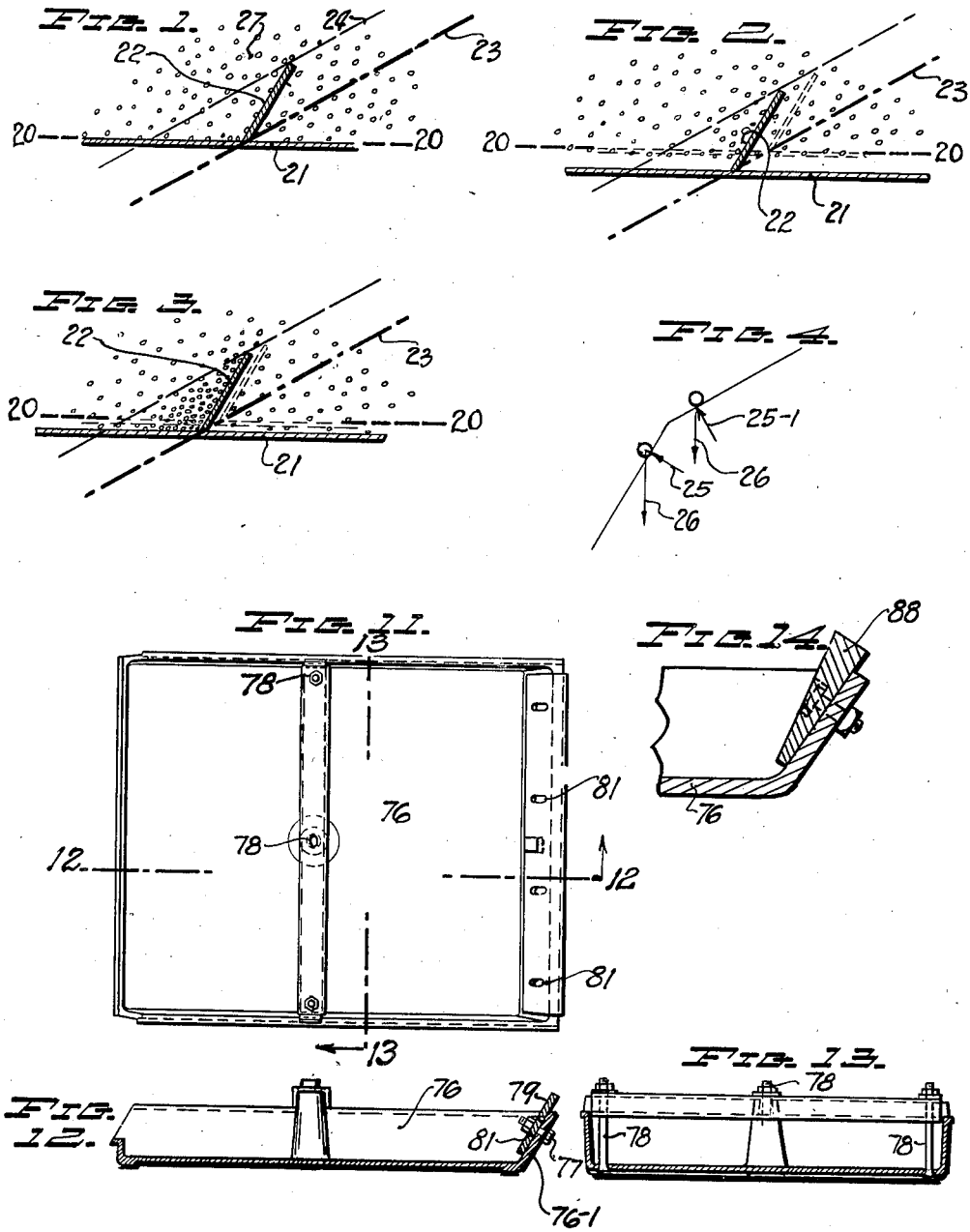
Inventor:
G. W. RATHJENS,
By ........ Mallinckrodt.
Attorney

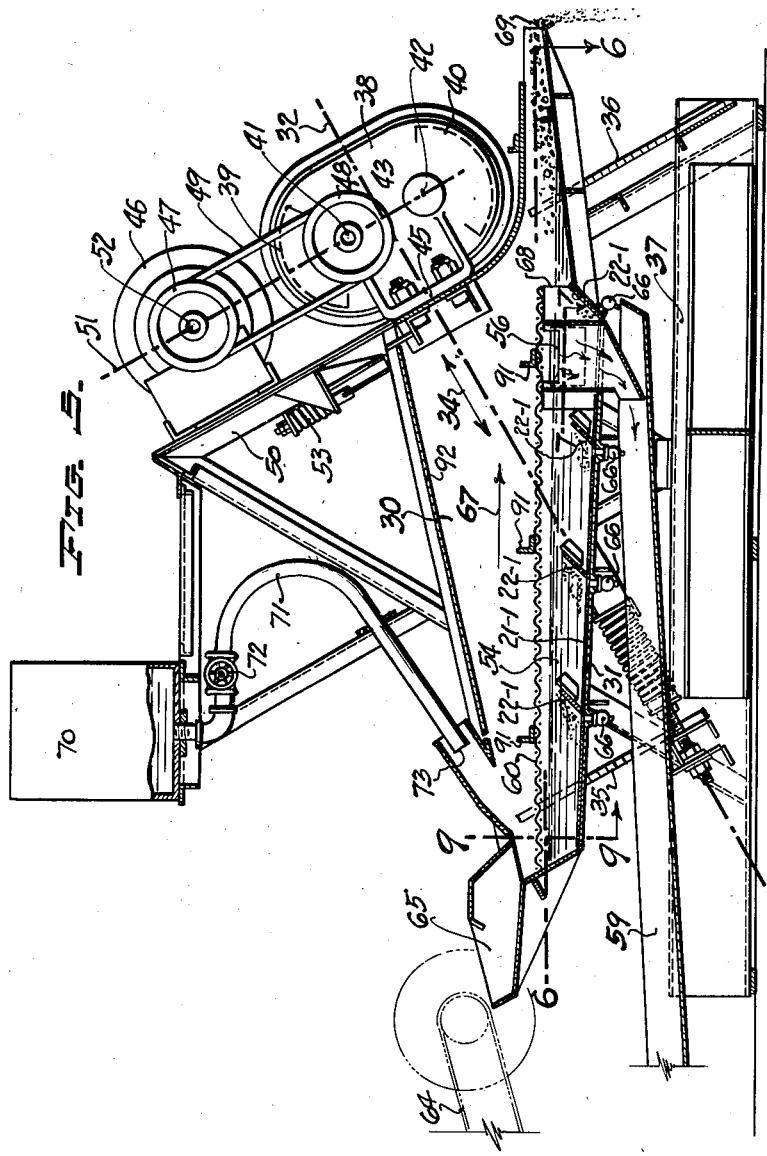

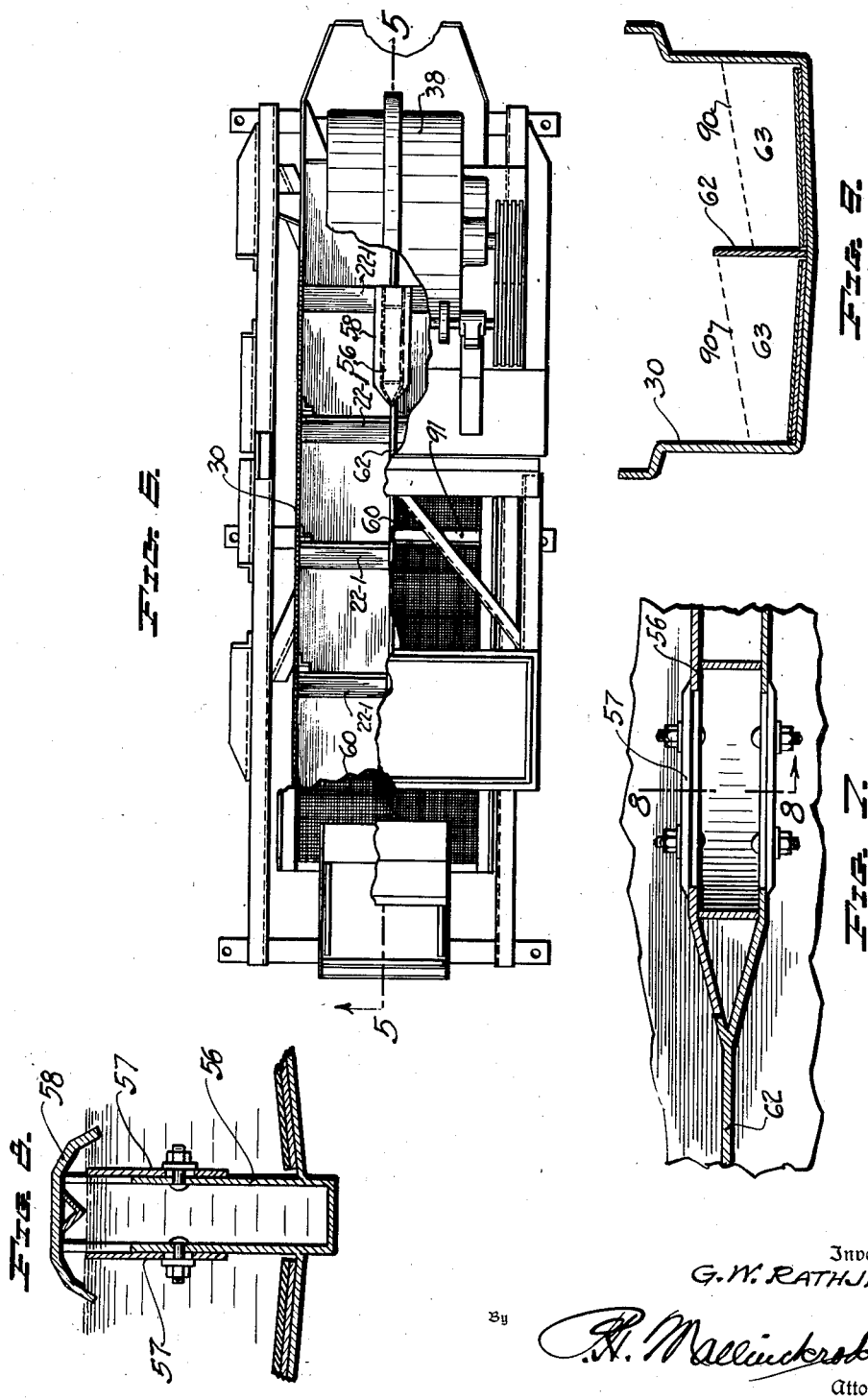

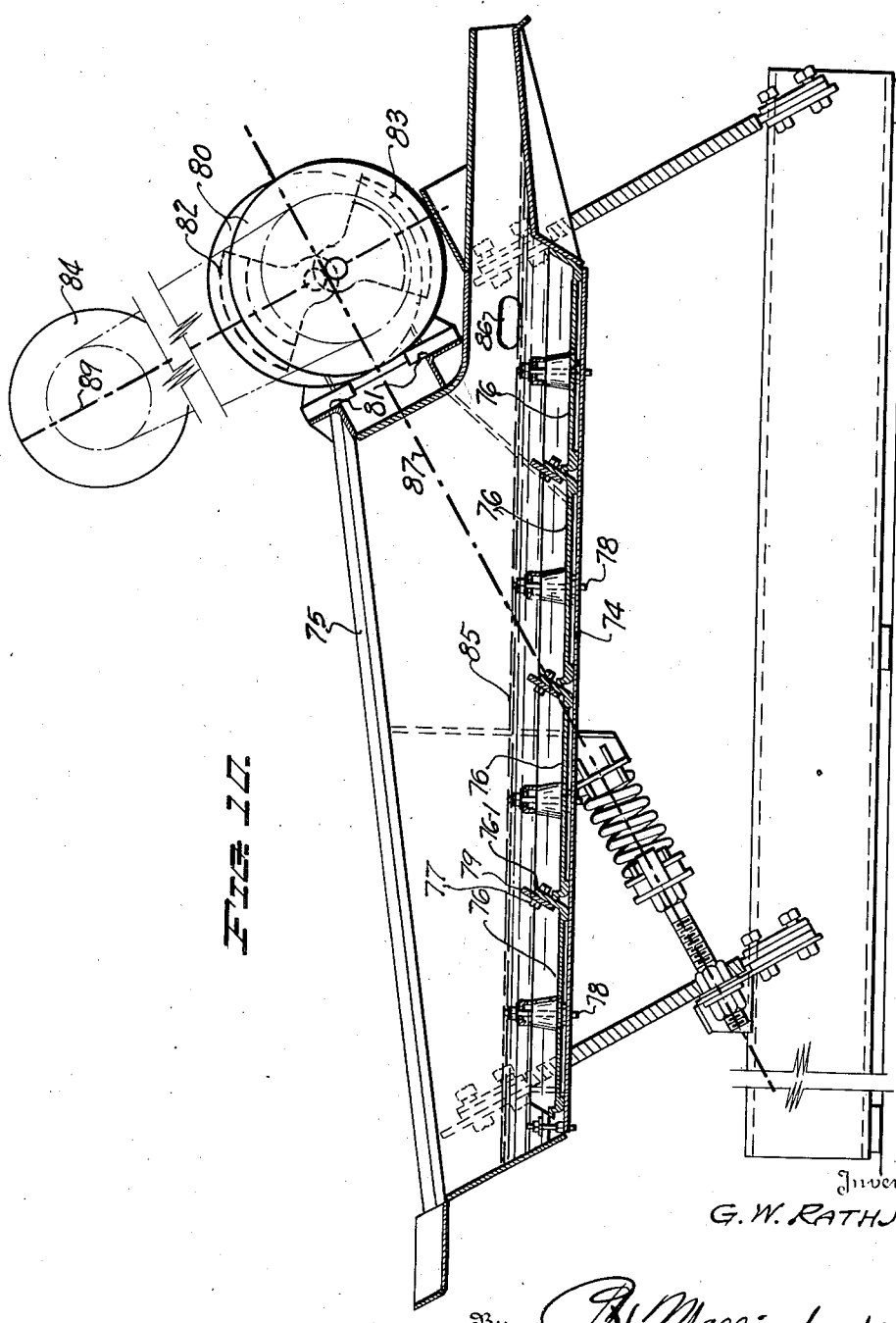

Patented Nov. 16, 1943

2,334,217

UNITED STATES PATENT OFFICE 2,334,217

SEPARATING MATERIALS, SEGREGATING MATERIALS, AND CONTACTING MATERIALS

George W. Rathjens, Salt Lake City, Utah

Application October 4, 1940, Serial No. 359,783

8 Claims. (Cl. 209—437)

This invention relates to a method and apparatus for separating materials, segregating materials and contacting non-coherent materials capable of being dispersed in a fluid. Forces are developed whose underlying principles are similar in some respects to those disclosed in my United States Patent No. 2,097,422, but the manner in which the force or forces acting upon the materials are utilized, is novel.

In separating different materials from one another, such for example, as precious metals from alluvial sands or gravels, I have discovered that the nature or degree of packing between and among the different particles of which the mass is composed, plays an important part. By closely controlling the tendency to pack, new results in the various separating, segregating and contacting operations are attained. The invention contemplates the employment of a number of interrelated vibratory forces among which, at least one force stands characteristically apart, since it can be definitely controlled. This characteristic force has a vertical component which acts in a direction counter to the force of gravity.

The material to be operated upon is advantageously caused to advance along a main or primary surface because of the vibratory motion thereof, until at the proper point, at least a portion of the advancing material is intercepted by an auxiliary or secondary surface which is inclined relatively to the vertical, and slopes upwardly and forwardly with respect to the advancing material.

The material has impressed upon its constituent particles, a certain directional force which causes the particles to move along and over the main surface, and in so doing to meet and contact the auxiliary surface or surfaces. Because of the resistance offered by the auxiliary surface or surfaces to the moving particles, the material is compacted. In consequence of all the forces acting upon them, the particles immediately in front of an auxiliary surface become packed to a greater or lesser degree. The fact of this packing, however, does not mean that the particles are entirely deprived of mobility but on the contrary, the tendency to pack in reality assists in a continual reassortment of the frontal particles of the material mass, and also in a corresponding consolidation of other portions of the material. Such consolidation is brought about by moving the material along the main surface and bringing it into contact with the auxiliary surface which has its significant motion in a direction counter to the direction of motion of the material in a half cycle. By this means a plane of shear is developed within the material mass, the location of this plane of shear being determined by various factors.

The motion of the said surfaces is reciprocative and develops the significant shear intermittently, not continuously, that is to say, only on the backward stroke. The degree of change in packing of the particles immediately in front of the auxiliary surface, or the number of particles being brought into contact with said auxiliary surface, is greater during that unit of time in which shear is effected in the mass, than during the portion of time when such shear is not being developed.

In the drawings,

Fig. 1 is a diagram representing in vertical section taken along the line of action, approximately a dispersion of material particles at the beginning of a cycle of reciprocative motion;

Fig. 2, a diagram similar to Fig. 1, but representing approximately the further dispersion of the particles after the motion cycle has reached a point a fraction less than one-half a motion-cycle;

Fig. 3, a diagram similar to Figs. 1 and 2, but representing approximately the packing of particles in a triangular zone of action after a fractional cyclic motion greater than one-half a cycle has occurred;

Fig. 4, a diagram in vertical section, representing a disposition of forces acting upon certain particles, and showing also, a compound auxiliary surface instead of the simple auxiliary surface of Figs. 1 to 3;

Fig. 5, an elevation, partly in longitudinal, vertical section taken on the line 5—5, Fig. 6, through a machine suitable for practicing the process;

Fig. 6, a plan, partly in horizontal section, taken on the line 6—6 in Fig. 5;

Fig. 7, a fragmentary horizontal section taken on the line 7—7, Fig. 5, drawn to an enlarged scale;

Fig. 8, a vertical section taken on the line 8—8, Fig. 7;

Fig. 9, a vertical section taken on the line 9—9, Fig. 5, drawn to approximately the same scale as Figs. 7 and 8, the screen and parts in the background being omitted;

Fig. 10, a longitudinal, vertical section similar to Fig. 5, but showing a machine of somewhat different construction;

Fig. 11, a plan of an individual riffle pan of Fig. 10, drawn to an enlarged scale;

Figs. 12 and 13, vertical sections taken respectively on the lines 12—12 and 13—13 in Fig. 11; and, Fig. 14, another construction of the riffle pan in the portion enclosed by the broken line 14 in Fig. 12, drawn to an enlarged scale.

Referring to the drawings, the line 20—20 in Figs. 1, 2 and 3, represents a datum plane. The numeral 21 denotes a main or deck surface which is preferably substantially plane and is disposed to move up and down in suitable relation to the datum plane, advantageously in parallellism with it.

In Fig. 1, the main surface 21 is shown in coincidence with the datum plane 20—20.

In Fig. 2, the main surface is shown after it has descended from the datum plane a distance corresponding to less than one-half a cycle of motion.

In Fig. 3, the main surface is shown in a position where it has completed more than one-half a cycle of motion and where it is on its way back to the initial position in the datum plane.

The main surface 21 is intersected by an auxiliary riffle-surface 22 which is disposed in other than a vertical position, but so that it slopes upwardly in the direction of motion of material particles traveling over the main surface, and forms an obtuse-angled riffle-pocket. The main and auxiliary surfaces are preferably fixed relatively to each other and move as a unit. This unit is reciprocated along a line which is located in proper angular relationship to both the main surface and the auxiliary surface.

The main surface 21 at zero hour coincides with the datum plane 20—20 in Fig. 1. At zero hour plus a fraction of a cycle less than one-half of said cycle, the main surface 21 will have descended in a backward stroke to the position shown in Fig. 2. Since the auxiliary surface 22 is normally fixed in relation to the main surface, the auxiliary surface in a backward stroke will have moved from the position 22 in Fig. 1 to the position 22 in Fig. 2.

The unit moves along the line 32 whereby the auxiliary surface in a downstroke is caused to cut through a mass of material particles 27 along the line 24. In this portion of the cycle, materials immediately above the main surface are descending, many of them vertically. The action of the auxiliary surface in its downward and backward movement, is to intercept those particles in its zone of influence so as to pack the material closer and at the same time to subject the particles which are being brought into contact with such auxiliary surfaces, to the action of the forces represented by lines 25 and 25—1 in Fig. 4.

The vertical arrows 26 in Fig. 4 represent the resultants of all forces acting vertically on the particles during that portion of the cycle in which the forces 25 and 25—1 also act on the same particles.

In Fig. 3 are represented the positions of the main surface and the auxiliary surface at the time in the cycle which is equal to zero hour plus a fraction of a cycle greater than one-half. It will be noted that during this portion of the cycle, while the auxiliary surface is again moving upward and forward, the forces 25 and 25—1 in Fig. 4, are not being developed with respect to the particle immediately adjacent or contacting the auxiliary surface.

The forces 25 and 25—1, acting on the particle because of the obstructing nature of the auxiliary or barrier surface 22, can be reduced to zero, or they can be increased at will from the zero value, until their direction is horizontal.

In order to cause material particles to move over the main surface, the line of reciprocative force must have a horizontal component, and the direction of travel of the material over the main surface, must be towards the acute angle formed by the intersection of the line of action of the reciprocative force with its horizontal component, the said acute angle being located above the horizontal component.

In actual practice the auxiliary surface 22 is limited in its upward extent, and its upper edge is naturally transverse to the line of reciprocation. In being reciprocated, the said transverse upper edge moves along the line of reciprocation, thereby generating a surface that may conveniently be called a surface of "shear." If the said transverse upper edge is substantially straight, the surface of shear is plane, and may be called a "shear plane." In Figs. 1 to 3, the line 24 indicates the trace of such a shear plane. The term "shear" is derived from the fact that the upper edge of the auxiliary surface, because of the inertia of the mass of material, shears through the particles in which it is submerged.

In separating and/or segregating materials, the shear plane, auxiliary surface, and the main surface in Figs. 1 to 3, together, usually define a prismatic zone of triangular cross-section, and it is in this zone that the principal characteristic actions are manifested.

In using the invention for contacting purposes, such as passing gold particles, including very fine gold, over amalgam plates, the amalgam plates are advantageously placed so that the planes thereof, are substantially coincident or parallel, with the line of action of the applied force. In this way, the gold is caused to merely skim over the amalgam surface, and yet to effectively contact the same, thus accomplishing perfect amalgamation of the gold without causing the mercury to "flour."

Figs. 5 to 14 illustrate apparatus for carrying this invention into practice; a certain construction being shown in Figs. 5 and 6, and another in Fig. 10. The one in Figs. 5 and 6 comprises the reciprocating container or sluice 30 whose bottom 31 provides the main surface 21—1. Spaced apart from one another along the main surface are a plurality of riffles which provide the auxiliary surfaces 22—1.

The sluice is mounted for reciprocation along the line of action 32 as indicated by the double-pointed arrow 34, and is supported on the flexible vibrators 35 and 36, the vibrators being in turn supported on the base members 37. Reciprocatory motion may be imparted to the sluice by any suitable means, for example, a centrifugally actuated, reciprocatory motivating unit 38, of which there are several well known and commercially available types in everyday use. The particular unit illustrated in Figs. 5 and 6 comprises centrifugal weights 39 and 40 disposed to revolve around the respective centers 41 and 42, the weights being intergeared with each other.

The mechanism of the reciprocatory motivating unit is usually enclosed in a casing 43, which in turn may be rigidly mounted on the sluice 30, as indicated at 45, and receive its power from a motor 46 by means of the respective pulleys 47 and 48, and the belts 49. The motor may be rigidly mounted on a stationary frame 50 extending upwardly from the base members 37. It is advantageous that a line 51 which connects the centers of the motor and the reciprocatory motivating unit to one another, should make substantially a right angle with the line of action 32 so that, while the center 41 describes a short arc about the axis of the motor shaft 52, this arc is substantially equivalent to a short tangent described by the point of intersection between lines 32 and 51. The belts may be tensioned by means of a spring take-up 53.

The length of a stroke of the reciprocating sluice is governed by the total weight of the sluice, including its live load, relative to the centrifugal weights of the reciprocatory motivating unit. This means that in designing a machine, the dead and live weights of the sluice, the rate of speed of the reciprocation, and the effect of the centrifugal weights must all be correlated with one another.

The sluice in the present instance is designed for handling placer sands and gravels, and to this end forms a container for a suitable liquid such as water, indicated at 54, which submerges the riffles including the auxiliary surfaces 22—1. The depth of the water may be regulated by an adjustable overflow device 56, which is provided with adjustable side-plates 57 and a cover 58. The overflow device discharges into a trough 59 which conveys the overflowing matter to any suitable point of disposal (not shown).

Optional features of the sluice include the screen or other perforated grid 60, and one or more longitudinally extending partitions 62, by means of which latter the sluice is divided into a plurality of longitudinally extending compartments 63, the purpose of the partition appearing presently.

In operation, the material to be separated may be brought to the machine by means of a conveyor indicated in broken lines at 64. The conveyor may discharge into a hopper 65, from which the material is discharged upon the screen 60 along which, in the present instance, the relatively coarse material is propelled in the direction of the arrow 67, while the finer material passes through the screen and drops into the body of liquid 54.

Because of the peculiar vibratory motion and a high rate of reciprocation imparted to the sluice, as more fully explained hereinafter, certain portions of the material being treated, accumulate in front of the auxiliary surfaces 22—1 in accordance with the principles explained in connection with Figs. 1 to 4, and certain other portions of the material pass over the riffles and emerge at the point 68, being there joined by such portions as pass over the screen 60. From the point 68 the rejected portions are discharged from the sluice at the point 69.

Make-up water may advantageously be supplied from a tank 70 and be fed to the sluice through the pipe 71 controlled for example, by a valve 72 having its discharge at 73. After the machine has been running a certain length of time sufficient to collect the desired product in front of the auxiliary surfaces 22—1, this product may be flushed out through the stop-cocks 66, which discharge into the trough 59, and be recovered at a suitable point.

The apparatus shown in Figs. 10 to 14, introduces various differences in details of construction. In this case, the bottom 74 of the vibratory sluice 75, is substantially level instead of sloping as in the case of the sluice in Fig. 5, and is provided with removable riffle pans 76, these being rigidly fastened in the sluice by means of bolts 78 which extend through the bottom of the sluice.

The backs 76—1 of the riffle pans may slope upwardly as required, and be provided with adjustable and removable riffles 79, adjustment being effected for example, by means of bolts 77 in conjunction with slots 81. In the event that the inclination of riffle faces, which constitute auxiliary surfaces, as hereinbefore referred to, should require to be changed, wedge-shaped bars may be used. Wedges, such as the one at 88 of different angular magnitudes may be supplied, and a great variety of slopes be thereby obtained. Each wedge may provide two different slopes, one when the small part of the wedge is at the bottom as indicated in Fig. 14, and another when the same wedge is inverted (not shown).

Referring to Figs. 6 and 9, the purpose of longitudinal partitions such as the one at 62, which divides the sluice into separate compartments, is to provide for emergencies occurring at times when a sluice is used in conjunction with placer mining dredges. Such dredges are frequently subject to considerable listing, and when that takes place, the liquid tends all to run to one side of the sluice. By providing the longitudinal partitions, the liquid is kept from running to the one side, since it builds up in each compartment somewhat as indicated by the broken lines 90. While only one partition 62 is shown, it is to be understood that in a sluice of considerable width, it may be advantageous to use two or more longitudinal partitions.

An important consideration in the invention, is that the speed of operation shall be extremely rapid, since otherwise, the auxiliary surfaces hereinbefore described, cannot function properly. I fix the minimum speed of reciprocation at a rate such that in a down-stroke, the liquid in the container must descend at least faster than would be its fall in the same down-stroke because of the action of gravity alone. In other words, the distance that the liquid, and therefore the auxiliary or packing surfaces also, falls in a down-stroke, must be at least equal to $\frac{1}{2}gt^2$.

It is also important in the invention, that all undue vibration be eliminated, and to this end I have evolved a high speed reciprocatory system in which the formation of moments or couples is practically overcome. This system is described in an application for U. S. patent whose filing date is even with that of the present application. The fundamental consideration in this reciprocatory system is that the center of gravity of the dead load of the sluice, is calculated separately from the center of gravity of the live load thereof, and that the resultant center of gravity of both the dead and live loads, shall be located in the line of action of the applied motive force. An important consideration of the invention is to give the proper value to the gravity effect of the live load during its reciprocation. I have discovered that when high speeds of reciprocation are attained, such as those necessary to cause the liquid medium to descend in a down-stroke a distance greater than $\frac{1}{2}gt^2$, the live load during reciprocation exerts only a fractional part of its actual weight upon the container. Therefore, in locating the center of gravity of the live-load mass, I have found that it is necessary to regard this mass as being held in suspension, thereby reducing its weight effect to as little as one-third, or even less, of the weight effect of the normally static live-load weight. This procedure makes a very perceptible change in the location of the dynamic or live-load center of gravity from that of the static live-load center of gravity.

The location of the live-load center of gravity may be arrived at empirically, that is to say, by cut-and-try procedure, and highly satisfactory results obtained.

Barriers 91, Figs. 5 and 6, extending transversely of the screen or perforated surface 60, may advantageously be provided for packing at given points, the advancing material particles larger than the openings in the screen or perforated surface, the packing being intermittently changed because of the reciprocating motion already described herein.

A removable cover 92 for the sluice is desirable for confining the outward splash of the contents thereof during operation.

Briefly summarizing the method of the invention, a material capable of being dispersed in a liquid, is fed onto a main surface or deck submerged by the liquid. The material is advanced in serrated paths along the submerged surface to a given point, and during its advancing travel is subjected to certain separative and/or segregative influences, because of the peculiar reciprocative motion imparted to the submerged surface. The formation of the serrated paths is fully set forth in U. S. Patent No. 2,097,422. The peculiar motion is the result of reciprocating the surface along a line having both a vertical and a horizontal component at least so rapidly that the vertical is equal to the aforesaid $\frac{1}{2}gt^2$. Arriving at the given point, certain desired portions of the material are intermittently packed against a barrier or auxiliary surface which intersects the main surface and is inclined upwardly in the direction of advance of the material. The auxiliary surface is also subject to the said peculiar reciprocative motion.

The reciprocating motion causes a continual change in packing of the material, the expression "change in packing" being used to denote a change in the number of solid units in unit volume of material, either plus or minus—more open packing if minus—closer packing if plus. The zone of packing action is bounded at least partially by an imaginary shearing surface, and a surface of maximum packing. The novel packing result is accomplished because the tendency of the different material particles is to ascend the inclined, auxiliary surface in characteristically different degrees.

In the instance of Fig. 10, the motivating unit 80 is somewhat different from the one shown in Fig. 5, but effects a similar result, being rigidly mounted at 81 on the sluice 75. This motivating unit includes the centrifugal weights 82 and 83, and may be driven from a stationary motor 84. The level of the liquid 85 may be maintained substantially constant by providing the overflow opening 86.

The line of action 87 of the motivating force is substantially perpendicular to the line 89 which joins the centers of the motivating unit and motor in its mean position.

Having fully described my invention what I claim is:

1. Apparatus for separating, segregating, and contacting materials capable of being dispersed within a liquid medium, including in combination, a container adapted to confine a liquid medium and having a deck surface disposed to be submerged by the said liquid medium; an auxiliary riffle-surface which intersects the said deck surface, intermediate the boundary edges thereof, in an acute angle and slopes upwardly relative to said deck surface so as to undercut advancing materials and form an obtuse-angled riffle pocket; means for reciprocating the container in up-strokes and down-strokes, alternating one with another, and along a line having a vertical component and a horizontal component and which slopes upwardly in the same direction as the upward slope of the said auxiliary riffle-surface, making an acute angle with said deck surface, the said materials being thereby caused to advance across said deck surface against the acute angle and upward slope of said auxiliary riffle-surface, and the upper edge of said auxiliary riffle-surface being thereby caused to generate a shear plane through the said materials at each down-stroke of the container.

2. Apparatus according to claim 1, wherein the said means for reciprocating the container is effective to move the container so rapidly that the liquid medium contained thereby descends in a down-stroke a distance at least equal to $\frac{1}{2}gt^2$.

3. Apparatus according to claim 1, wherein the line of action of the said means for reciprocating the container passes substantially through the combined centers of gravity of the dead load and of the live load, inclusive of the said liquid medium.

4. Apparatus according to claim 1, wherein the said auxiliary riffle-surface is substantially parallel with the line of action of the applied motive force.

5. Apparatus for separating, segregating, and contacting materials capable of being dispersed within a liquid medium, including in combination, a container adapted to confine a liquid medium and having a deck surface disposed to be submerged by the said liquid medium; means for reciprocating the container in up-strokes and down-strokes, alternating one with another, and along a line having a vertical component and a horizontal component and which makes an acute angle with the said deck surface, the said materials being thereby caused to advance across said deck surface in the direction of the upward slope of said line of reciprocation, the said line of action of the said means for reciprocating the container passing substantially through the combined centers of gravity of the dead load and of the live load, inclusive of the said liquid medium.

6. Apparatus according to claim 5, wherein the center of gravity of the live load is considered from the standpoint of the effective weight of the live load during rates of reciprocation such that the liquid medium descends in a down-stroke a distance greater than $\frac{1}{2}gt^2$.

7. Apparatus for separating, segregating, and contacting materials capable of being dispersed within a liquid medium, including in combination, a container adapted to confine a liquid medium and having a deck surface disposed to be submerged by the said liquid medium; an auxiliary riffle-surface which intersects the said deck surface, intermediate the boundary edges thereof, in an acute angle and slopes upwardly relative to said deck surface so as to undercut advancing materials and form an obtuse-angled riffle pocket; means for reciprocating the container in up-strokes and down-strokes, alternating one with another, and along a line having a vertical component and a horizontal component and which slopes upwardly in the same direction as the upward slope of the said auxiliary riffle-surface, making an acute angle with said deck surface, the said materials being thereby caused to advance across said deck surface against the acute angle and upward slope of said auxiliary riffle-surface, and the upper edge of said auxiliary riffle-surface being thereby caused to generate a shear plane through the said materials at each down-stroke of the container, the line of action of the said means for reciprocating the container passing substantially through the combined centers of gravity of the dead load and of the live load, inclusive of the said liquid medium, the center of gravity of the live load being considered from the standpoint of the effective weight of the live load during rates of reciprocation such that the liquid medium descends in a down-stroke a distance greater than $\tfrac{1}{2}gt^2$.

8. Apparatus according to claim 7, wherein the said auxiliary riffle-surface is substantially parallel with the line of action of the applied motive force.

GEORGE W. RATHJENS.